(12) United States Patent
Lin

(10) Patent No.: US 6,881,487 B2
(45) Date of Patent: Apr. 19, 2005

(54) HEAT TREATABLE COATED ARTICLES WITH ZIRCONIUM OR ZIRCONIUM NITRIDE LAYER AND METHODS OF MAKING SAME

(75) Inventor: Yuping Lin, West Bloomfield, MI (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

(21) Appl. No.: 10/295,028

(22) Filed: Nov. 15, 2002

(65) Prior Publication Data

US 2004/0096671 A1 May 20, 2004

(51) Int. Cl.⁷ ................................................ B32B 9/00
(52) U.S. Cl. ....................... 428/428; 428/432; 428/699; 428/701; 428/704
(58) Field of Search ................................ 428/428, 432, 428/689, 698, 699, 704

(56) References Cited

U.S. PATENT DOCUMENTS

| | | |
|---|---|---|
| 4,690,871 A | 9/1987 | Gordon |
| 5,085,926 A | 2/1992 | Iida et al. |
| 5,216,542 A | 6/1993 | Szczyrbowski et al. |
| 5,298,048 A | 3/1994 | Lingle et al. |
| 5,376,455 A | 12/1994 | Hartig et al. |
| 5,552,180 A | 9/1996 | Finley et al. |
| 5,688,585 A | 11/1997 | Lingle et al. |
| 5,837,108 A | 11/1998 | Lingle et al. |
| 5,939,201 A | 8/1999 | Boire et al. |
| 6,014,872 A | 1/2000 | Hartig et al. |
| 6,114,043 A | 9/2000 | Joret |
| 6,159,607 A | 12/2000 | Hartig et al. |
| 6,413,643 B1 * | 7/2002 | Kunisada et al. ........... 428/432 |
| 6,466,298 B1 | 10/2002 | Fix et al. |
| 6,558,800 B1 | 5/2003 | Stachowiak |
| 6,576,349 B1 | 6/2003 | Lingle et al. |
| 2001/0044032 A1 | 11/2001 | Finley et al. |
| 2002/0192473 A1 | 12/2002 | Gentilhomme et al. |

FOREIGN PATENT DOCUMENTS

| | | |
|---|---|---|
| DE | 195 41 014 | 5/1997 |
| JP | 63-206333 | 8/1988 |
| JP | 64-005930 | 1/1989 |
| JP | 4-243935 | 9/1992 |
| JP | 5-294674 | 11/1993 |
| WO | WO 02/04375 | 1/2002 |

OTHER PUBLICATIONS

"Heat Insulating Glass Which Can Be Thermally Worked", Hironobu, 05124839, Oct. 1991.
"Optical Properties of Magnetron Sputtered Boride, Oxiboride, and Nitriboride Coatings", Martin et al., 40$^{th}$ Annual Technical Conference Proceedings, (1997) pp. 187–191.
International Search Report mailed Apr. 26, 2004.

* cited by examiner

Primary Examiner—Stephen Stein
Assistant Examiner—G. Blackwell-Rudasill
(74) Attorney, Agent, or Firm—Nixon & Vanderhye P.C.

(57) ABSTRACT

A coated article is provided with a coating or layer system that includes at least one layer including zirconium (Zr) and/or zirconium nitride ($ZrN_x$) sandwiched between at least a pair of dielectric layers. In certain example embodiments, the coating or layer system has good corrosion resistance, good mechanical performance such as scratch resistance, and/or good color stability (i.e., a low $\Delta E^*$ value(s)) upon heat treatment (HT).

30 Claims, 1 Drawing Sheet

HEAT TREATABLE COATED ARTICLES WITH ZIRCONIUM OR ZIRCONIUM NITRIDE LAYER AND METHODS OF MAKING SAME

This invention relates to coated articles that include at least one zirconium (Zr) or zirconium nitride (ZrN) layer sandwiched between at least a pair of dielectric layers. Such coated articles may be used in insulating glass (IG) window units, monolithic window units, vehicle windows, and/or other suitable applications.

BACKGROUND OF THE INVENTION

Solar control coatings having a layer stack of glass/$Si_3N_4$/NiCr/$Si_3N_4$ are known in the art. Unfortunately, while such layer stacks provide efficient solar control and are overall good coatings, they sometimes are lacking in terms of: (a) corrosion resistance to acid (e.g., HCl); (b) mechanical performance such as scratch resistance; and/or (c) thermal stability upon heat treatment for tempering, heat bending, or the like (i.e., $\Delta E^*$ value(s)).

Accordingly, there exists a need in the art for a coated article that has improved characteristics with respect to (a), (b) and/or (c) compared to a conventional layer stack of glass/$Si_3N_4$/NiCr/$Si_3N_4$, but which still is capable of acceptable solar control (e.g., blocking a reasonable amount of IR and/or UV radiation). It is a purpose of this invention to fulfill at least one of the above-listed needs, and/or other needs which will become apparent to the skilled artisan once given the following disclosure.

SUMMARY OF THE INVENTION

In certain example embodiments of this invention, a coating or layer system is provided which includes at least one layer comprising zirconium (Zr) and/or zirconium nitride (ZrN) sandwiched between at least a pair of dielectric layers. In certain example embodiments, the coating or layer system has good corrosion resistance to acid(s) such as HCl, good mechanical performance such as scratch resistance, and/or good color stability (i.e., a low $\Delta E^*$ value(s)) upon heat treatment (HT).

Generally speaking, certain example embodiments of this invention fulfill one or more of the above listed objects and/or needs by providing a coated article including a layer system supported by a glass substrate, the layer system comprising: a first layer comprising silicon nitride; a layer comprising zirconium or zirconium nitride provided on the glass substrate over the first layer comprising silicon nitride; and a second layer comprising silicon nitride provided on the glass substrate over the layer comprising zirconium or zirconium nitride.

Certain other example embodiments of this invention fulfill one or more of the above-listed needs by providing a coated article including a layer system supported by a substrate, the layer system comprising: a first dielectric layer; a layer comprising zirconium; a second dielectric layer; and wherein the layer comprising zirconium is sandwiched between at least the first and second dielectric layers.

Certain other example embodiments of this invention fulfill one or more of the above-listed needs by providing a method of making a coated article, the method comprising: providing a glass substrate; sputtering a first dielectric layer on the glass substrate; sputtering a layer comprising Zr on the glass substrate over the first dielectric layer; sputtering a second dielectric layer over the layer comprising Zr; and heat treating the coated article including the first and second dielectric layers and the layer comprising Zr so that as a result of the heat treating the coated article has a $\Delta E^*_G$ (glass side reflective) value of no greater than 4.0.

IN THE DRAWINGS

DETAILED DESCRIPTION OF CERTAIN EXAMPLE EMBODIMENTS OF THE INVENTION

Certain embodiments of this invention provide a coating or layer system that may be used in windows such as monolithic windows, IG units, vehicle windows (windshields, backlites, and/or side windows), architectural windows (commercial or residential), and/or other suitable applications. Certain example embodiments of this invention provide a layer system that is characterized by good (a) corrosion resistance to acid (e.g., HCl); (b) mechanical performance such as scratch resistance; and/or (c) thermal stability upon heat treatment. With respect to thermal stability upon heat treatment (HT), this means a low value of $\Delta E^*$ and/or a low value of $\Delta a^*$; where $\Delta$ is indicative of change in view of HT such as thermal tempering, heat bending, or thermal heat strengthening, monolithically and/or in the context of dual pane environments such as IG units or windshields. Such heat treatments sometimes necessitate heating the coated substrate to temperatures from about 580° C. up to about 800° C. for 5 minutes or more.

Figure 1:
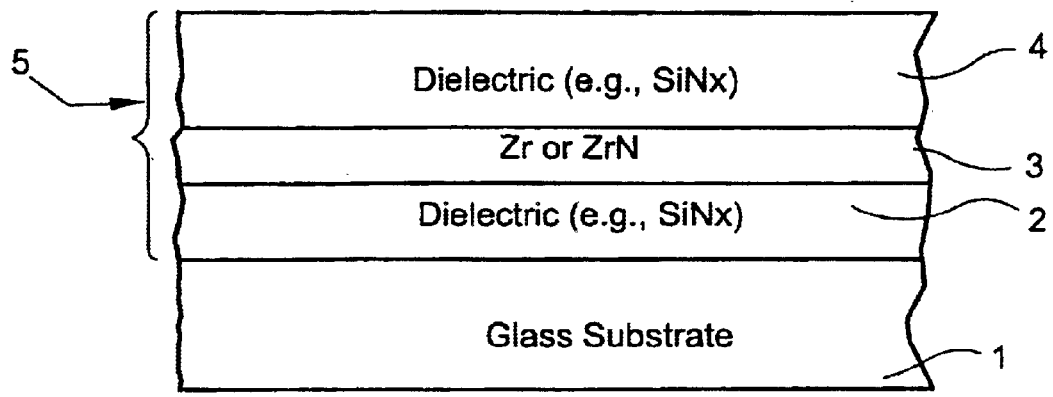
FIG. 1 is a partial cross sectional view of an embodiment of a coated article (heat treated or not heat treated) according to an example embodiment of this invention.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first dielectric layer 2 (e.g., of or including silicon nitride (e.g., $Si_3N_4$), titanium oxide, titanium nitride, silicon oxynitride, aluminum oxide, zinc oxide, or the like), IR reflecting layer 3 of or including zirconium (Zr) or zirconium nitride (e.g., ZrN), and second dielectric layer 4 (e.g., of or including silicon nitride (e.g., $Si_3N_4$), titanium nitride, titanium oxide, silicon oxynitride, zinc oxide, aluminum nitride, or the like). Overall coating 5 includes at least layers 2–4. Infrared (IR) reflecting layer 3 may be metallic Zr in certain example embodiments of this invention, or alternatively may be of or include ZrN in other embodiments of this invention. It is noted that the terms "oxide" and "nitride" as used herein include various stoichiometries. For example, the term titanium oxide includes TiO, $TiO_2$ and various other stoichiometries $TiO_x$. In a similar manner, the term zirconium nitride includes both stoichiometric and non-stoichiometric nitrides of Zr. As another example, the term silicon nitride includes stoichiometric $Si_3N_4$ as well as other non-stoichiometric nitrides of silicon. Layers 2–4 may be deposited on substrate 1 via magnetron sputtering, or via any other suitable technique in different embodiments of this invention. While dielectrics 2, 4 may be any suitable dielectrics in different embodiments of this invention, it has surprisingly been found that nitrides work particularly well—better than oxides.

While FIG. 1 illustrates coating 5 in a manner where Zr or ZrN layer 3 is in direct contact with dielectric layers 2 and 4, the instant invention is not so limited. Other layer(s) may be provided between layers 2 and 3 (and/or between layers 3 and 4) in certain other embodiments of this invention. Moreover, other layer(s) may be provided between substrate 1 and layer 2 in certain embodiments of this invention; and/or other layer(s) may be provided on substrate 1 over layer 4 in certain embodiments of this invention. Thus, while the coating 5 or layers thereof is/are "on" or "supported by" substrate 1 (directly or indirectly), other layer(s) may be provided therebetween. Thus, for example, the layer system 5 and layers thereof shown in FIG. 1 are considered "on" the substrate 1 even when other layer(s) may be provided therebetween (i.e., the terms "on" and "supported by" as used herein are not limited to directly contacting).

Surprisingly, it has been found that the use of Zr or ZrN in layer 3 (as opposed to only NiCr) results in a coated article having: (a) improved corrosion resistance with respect to acid such as HCl; (b) improved mechanical performance such as better scratch resistance; and/or (c) improved thermal stability (i.e., lower $\Delta E^*$ value(s)). Moreover, the use of Zr and/or ZrN enables a deeper blue color to be achieved in certain example embodiments of this invention.

In certain example embodiments of this invention, dielectric anti-reflection layers 2 and/or 4 each may have an index of refraction less than that of metal or metal nitride layer 3 for anti-reflective purposes (e.g., layers 2 and/or 4 may have an index of refraction "n" of from about 1.9 to 2.1, while 3 may have an index "n" higher than that). In embodiments of this invention where layers 2 and/or 4 comprise silicon nitride (e.g., $Si_3N_4$), sputtering targets including Si employed to form these layers may or may not be admixed with up to 6–20% by weight aluminum or stainless steel (e.g. SS#316), with about this amount then appearing in the layers so formed.

Figure 2:
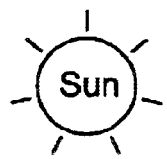
FIG. 2 is a partial cross-sectional view of an IG unit as contemplated by this invention, in which the coating or layer system of FIG. 1 may be used.
Figure 2:
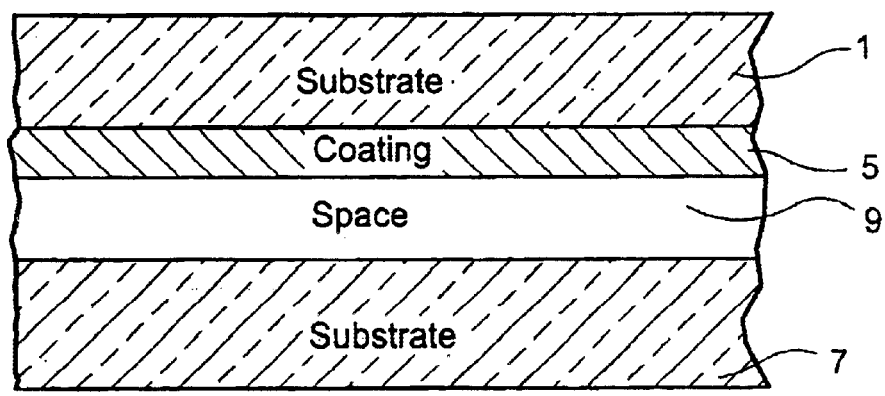

FIG. 2 illustrates the coating or layer system 5 of FIG. 1 being utilized on surface #2 of an IG (insulating glass) window unit. The two glass substrates (e.g., float glass 2 mm to 12 mm thick) 1, 7 in FIG. 2 are sealed at their peripheral edges by a conventional sealant and/or spacer (not shown) and may be provided with a conventional desiccant strip (not shown). The panes are then retained in a conventional window or door retaining frame. By sealing the peripheral edges of the glass sheets and replacing the air in insulating space (or chamber) 9 with a gas such as argon, a high insulating value IG unit is formed. Optionally, insulating space 9 may be at a pressure less than atmospheric pressure in certain alternative embodiments, although this of course is not necessary in all IG embodiments. Coating 5 from FIG. 1 may be provided on the inner wall of substrate 1 in certain embodiments of this invention (as in FIG. 2), and/or on the inner wall of substrate 7 in other embodiments of this invention.

Turning back to FIG. 1, while various thicknesses may be used consistent with one or more of the objects and/or needs discussed herein. According to certain non-limiting example embodiments of this invention, example thicknesses and materials for the respective layers on the glass substrate 1 are as follows:

TABLE 1

| Layer | (Thicknesses) | |
|---|---|---|
| | Preferred Range (Å) | More Preferred (Å) |
| silicon nitride (layer 2) | 100–900 Å | 200–800 Å |
| Zr or $ZrN_x$ (layer 3) | 50–900 Å | 100–500 Å |
| silicon nitride (layer 4) | 100–900 Å | 150–400 Å |

In certain exemplary embodiments, the color stability with lengthy HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

The value(s) $\Delta E^*$ is important in determining whether or not there is matchability, or substantial color matchability upon HT, in the context of certain embodiments of this invention. Color herein is described by reference to the conventional $a^*$, $b^*$ values. The term $\Delta a^*$ is simply indicative of how much color value $a^*$ changes due to HT.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. (John Wiley & Sons, 1987). As used in the art, $\Delta E^*$ (and $\Delta E$) is a way of adequately expressing the change (or lack thereof) in reflectance and/or transmittance (and thus color appearance, as well) in an article after or due to HT. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein:

$L^*$ is (CIE 1976) lightness units $a^*$ is (CIE 1976) red-green units $b^*$ is (CIE 1976) yellow-blue units and the distance $\Delta E^*$ between $L^*_o a^*_o b^*_o$ and $L^*_1 a^*_1 b^*_1$ is:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (coated article) after heat treatment; and the numbers employed (e.g., $a^*$, $b^*$, $L^*$) are those calculated by the aforesaid (CIE LAB 1976) $L^*$, $a^*$, $b^*$ coordinate technique. In a similar manner, $\Delta E$ may be calculated using equation (1) by replacing $a^*$, $b^*$, $L^*$ with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

In certain example non-limiting embodiments of this invention, coatings or layer systems herein provided on clear monolithic glass substrates have reflective color as follows before heat treatment, as viewed from the glass side of the coated article (Ill. C., 2 degree observer):

TABLE 2

Glass Side Reflective Color ($R_G$) Before Heat Treatment

|  | General | Preferred |
|---|---|---|
| a* | −8 to +8 | −5 to +6 |
| b* | −30 to +20 | −20 to +10 |
| L* | 10 to 75 | 25 to 60 |

After heat treatment (HT), in certain example embodiments of this invention coated articles have color characteristics as follows in Table 3. It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 5 is provided.

TABLE 3

Color due to/after Heat Treatment

| | General | Preferred | Most Preferred |
|---|---|---|---|
| $\Delta E^*_G$ | <=5.5 | <=4.0 | <=2.5 |
| $\Delta E^*_F$ | <=5.0 | <=4.0 | <=3.5 |
| $\Delta E^*_T$ | <=5.5 | <=4.0 | <=2.5 |
| $a^*_G$ | −6 to +6 | −4 to +4 | −3 to +3 |
| $b^*_G$ | −30 to +25 | −20 to +20 | −17 to +10 |
| $T_{VIS}$ (TY): | 8–80% | 10–40% | 10–30% |

For purposes of example only, a plurality of examples representing different example embodiments of this invention are set forth below.

EXAMPLES

The following seven monolithic Example coated articles (each ultimately annealed and heat treated) were made. The coating 5 for each Example is shown in FIG. 1, and thus includes layers 2, 3 and 4. The glass substrates were clear and about 3 mm thick in each Example. For each example, bottom dielectric layer 2 was of silicon nitride and was about 770 Å thick. Also, in each example the top dielectric layer 4 was of silicon nitride and was about 300 Å thick. The dielectric layers included a small amount of stainless steel and/or aluminum. The IR reflecting layer 3 was of metallic Zr in Example 1 and of zirconium nitride ($ZrN_x$) in Examples 2–7, but was always about 200 Å thick (the nitrogen content "x" in Examples 2–7 varied depending upon the nitrogen gas flow in the sputter coater). Line "speed" in Table 4 is in terms of inches/minute. $T_{vis}$ in Table 4 below means visible transmission (Ill. C, 2 deg. observer). The IR reflecting layers in Examples 1–7 were deposited as follows.

TABLE 4

Coating Deposition Conditions

| Parameter | Ex. 1 | Ex. 2 | Ex. 3 | Ex. 4 | Ex. 5 | Ex. 6 | Ex. 7 |
|---|---|---|---|---|---|---|---|
| Target: | Zr | Zr | Zr | Zr | Zr | Zr | Zr |
| Ar gas flow (sccm): | 30 | 30 | 30 | 30 | 30 | 30 | 30 |
| $N_2$ gas flow (sccm): | 0 | 6 | 12 | 4 | 6 | 8 | 10 |
| Power (kW): | 1 | 1 | 1 | 1 | 1 | 1 | 1 |
| Speed (IPM): | 37.5 | 65.6 | 30 | 40 | 31 | 12 | 8 |
| # passes: | 1 | 2 | 4 | 1 | 1 | 1 | 1 |

After being sputter coated in the manners described above, the Examples 1–7 had the following optical characteristics in annealed form (not HT) (Ill. C, 2 deg. observer):

TABLE 5

Characteristics - Annealed (non-HT)

| Parameter | Ex. 1 | Ex. 2 | Ex. 3 | Ex. 4 | Ex. 5 | Ex. 6 | Ex. 7 |
|---|---|---|---|---|---|---|---|
| $T_{VIS}$ (TY)(%): | 14.8 | 26.9 | 19.3 | 22.6 | 19.3 | 23.25 | 23.3 |
| $a^*_G$: | 1.77 | 4.79 | 2.33 | −0.46 | −2.1 | −3.11 | −3.78 |
| $b^*_G$: | −13.62 | −16.02 | −14.17 | −18.61 | −16.68 | −10.47 | −9.2 |
| $L^*_G$: | 52.9 | 41.02 | 43.7 | 49.9 | 53.7 | 55.15 | 53.05 |
| $R_S$ (ohms/square): | 106 | 113 | n/a | 110 | 107 | 80 | 110 |

It can be seen from Table 5 above that Example 1 where the IR reflecting layer 3 was metallic Zr had a higher transmission than Examples 2–7 where layer 3 was $ZrN_x$. However, it will be shown below that the use of nitride in layer 3 may in some cases be beneficial with respect to thermal stability upon HT and/or durability.

Table 6 set forth below illustrates thermal stability characteristics of certain Examples after heat treatment (HT). The HT performed on Examples 1–7 was for about 10 minutes at about 625 degrees C.

TABLE 6

Thermal Stability Upon Heat Treatment

| Parameter | Ex. 1 | Ex.2 | Ex. 3 | Ex. 4 | Ex. 5 | Ex. 6 | Ex. 7 |
|---|---|---|---|---|---|---|---|
| $\Delta E^*_G$: | 5.2 | 5.3 | 1.5 | 4.3 | 3.2 | 2.6 | 2.4 |
| $\Delta E^*_F$: | 4.0 | 2.7 | <=3.4 | n/a | n/a | n/a | n/a |
| $\Delta E^*_T$: | 2.4 | 3.6 | 5.3 | n/a | n/a | n/a | n/a |

As can be seen from Table 6, Example 1 with metallic Zr layer 3 had a better $\Delta E^*_T$ value than did Examples 2–3. However, in Example 3 where layer 3 was of $ZrN_x$ with significant nitrogen gas flow during sputtering, the best glass side reflective color stability upon HT (i.e., $\Delta E^*_G$) was realized. Given that the Examples where the most nitrogen was used in layer 3 (i.e., Examples 3 and 5–7) realized the best (i.e., lowest) glass side reflective $\Delta E^*$ values, it can be seen that nitriding layer 3 can improve thermal stability of the coating upon HT. The more nitrogen used, the better the thermal stability upon HT. In certain example embodiments of this invention, coated articles can have a $\Delta E^*_G$ value of no greater than 2.0. Thus, nitriding of the Zr layer may or may not be beneficial depending upon the desired application/function of layer 3 and the overall coating 5.

For purposes of comparison, consider the following layer stack: glass/$Si_3N_4$/NiCr/$Si_3N_4$, where the underlayer of $Si_3N_4$ is about 50–70 Å (angstroms) thick, the NiCr layer is about 325 Å thick, and the overcoat of $Si_3N_4$ is about 210–310 Å thick. This comparative coated article has a rather high transmissive $\Delta E^*$ value of about 5.9 after a heat treatment (HT) at 625 degrees C. for ten (10) minutes. This high transmissive $\Delta E^*$ value means that the coated article does not approximately match colorwise non-heat-treated counterpart versions with regard to transmissive color after 10 minutes of HT. In contrast, it can be seen that Examples 1–7 have better color stability upon HT (i.e., lower $\Delta E^*$) than this comparative layer stack of glass/$Si_3N_4$/NiCr/$Si_3N_4$. This example advantage of using Zr or $ZrN_x$ is clear in view of the above.

Tables 7a and 7b set forth below illustrates the good chemical durability of Examples 1–3, both before (A=annealed) and after (H) heat treatment. Each example coating was exposed to 1 hour of HCl acid boil, and also to 1 hour of NaOH boil. The AC values in Tables 7a and 7b are indicative of the change in a*, b*, and L* parameters caused by the respective boils. In particular, the $\Delta C$ values were determined in the same manner as the $\Delta E^*$ values defined above (see equations (1)–(4)), except that in equations (2)–(4) the subscript "o" represents the coating (or coated article) before the boil and the subscript "1" represents the coating (or coated article) after the boil.

TABLE 7a

Chemical Durability (HCl 1 hr. boil)

| Parameter | Ex. 1(A) | Ex. 1(H) | Ex. 2(A) | Ex. 2(H) | Ex. 3(A) | Ex. 3(B) |
|---|---|---|---|---|---|---|
| $\Delta C_G$: | 2.5 | 1.2 | 2.1 | 2 | 0.53 | 0.8 |
| $\Delta C_F$: | 1.9 | 0.9 | 1 | 1 | 0.77 | 2 |
| $\Delta C_T$: | 1.8 | 1 | 0.7 | 1.4 | 0.6 | 0.6 |

TABLE 7b

Chemical Durability (NaOH 1 hr. boil)

| Parameter | Ex. 1(A) | Ex. 1(H) | Ex. 2(A) | Ex. 2(H) | Ex. 3(A) | Ex. 3(B) |
|---|---|---|---|---|---|---|
| $\Delta C_G$: | 0.8 | 1.3 | 1.9 | 3.3 | 1.4 | 2.9 |
| $\Delta C_F$: | 10.3 | 8.3 | 9.5 | 10.6 | 5.3 | 11.3 |
| $\Delta C_T$: | 3.7 | 2.8 | 2.8 | 3.2 | 0.9 | 2.3 |

It can be seen from Tables 7a and 7b above that Examples 1–3 realized good chemical durability upon exposure to HCl acid treatment (HCl boil for one hour) both in annealed form and heat treated (e.g., tempered and/or heat bent) form. The lower the $\Delta C$ values, the better. Moreover, the Examples also have acceptable durability, especially from a glass side and transmissive perspective, upon NaOH exposure. In certain example embodiments of this invention, coated articles are chemically durable in that they have a $\Delta C_G$ value (upon 1 hr. HCl and/or NaOH boil) of no greater than 4.0, more preferably of no greater than 3.0, and most preferably no greater than 2.0.

Example 1 was found to have a shading coefficient (SC) of from about 0.25 to 0.45, more particularly from about 0.30 to 0.40. Examples 2–7 in general were found to have an SC slightly higher, i.e., from about 0.4 to 0.55, more particularly from about 0.42 to 0.49. Example 1 was found to have a SHGC of from about 0.25 to 0.35, more particularly from about 0.25 to 0.33; and Examples 2–7 were found to have a slightly higher SHGC of from about 0.35 to 0.45, more particularly from about 0.37 to 0.42.

Accordingly, advantages associated with the use of Zr and/or ZrN in a solar control coating include (a) improved corrosion resistance with respect to acid such as HCl; (b) improved mechanical performance such as better scratch resistance; and/or (c) improved thermal stability (i.e., lower $\Delta E^*$ value(s)). In certain embodiments of this invention, coated articles may or may not be heat treated.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_XY$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the term "transmittance" means solar transmittance, which is made up of visible light transmittance (TY), infrared radiation transmittance, and ultraviolet radiation transmittance. Total solar energy transmittance (TS) is then usually characterized as a weighted average of these other values. With respect to these transmittances, visible transmittance (TY), as reported herein, is characterized by the standard CIE Illuminant C, 2 degree observer, technique at 380–720 nm; near-infrared is 720–2500 nm; ultraviolet is 300–800 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C.,2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". For example, chemical durability may be determined by boiling a sample of a coated glass substrate in about 500 cc of 5% HCl for one hour (i.e. at about 195° F.). This is what is meant by HCl boil herein. Alternatively, chemical durability may be determined by an NaOH boil which includes boiling a sample of a coated glass substrate in a solution having a pH of about 12.2 that is a mixture of water and NaOH (about 0.4% NaOH); the solution is available from LabChem, Inc., Cat. No. LC 24270-4 (this is what is meant by NaOH boil herein). The NaOH boil may be carried out at a temperature of about 145 degrees F. (Examples above), or about 195 degrees F. in other instances.

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 580 degrees C. for a sufficient period to enable tempering. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a glass substrate, the layer system comprising:
    a first layer comprising silicon nitride;
    a layer comprising zirconium nitride provided on the glass substrate over the first layer comprising silicon nitride;
    a second layer comprising silicon nitride provided on the glass substrate over the layer comprising zirconium nitride;
    wherein the first layer comprising silicon nitride, located under the layer comprising zirconium nitride, is significantly thicker than the second layer comprising silicon nitride which is located over the layer comprising zirconium nitride, and
    wherein the second layer comprising silicon nitride is an overcoat so as to be an outermost layer of the layer system.

2. The coated article of claim 1, wherein the layer comprising zirconium nitride is in direct contact with each of the first and second layers comprising silicon nitride.

3. The coated article of claim 1, wherein at least one of the layers comprising silicon nitride further includes at least one of stainless steel, aluminum, and oxygen.

4. The coated article of claim 1, wherein the coated article is not heat treated.

5. The coated article of claim 1, wherein the coated article is heat treated and has a $\Delta E^*_G$ (glass side reflective) value of no greater than 4.0 due to heat treatment, wherein the heat treatment is for at least about 5 minutes at a temperature(s) of at least about 580 degrees C.

6. The coated article of claim 1, wherein the coated article is heat treated and has a $\Delta E^*_G$ (glass side reflective) value of no greater than 2.5 due to heat treatment.

7. The coated article of claim 1, wherein the coated article is heat treated and has a $\Delta E^*_G$ (glass side reflective) value of no greater than 2.0 due to heat treatment, wherein the heat treatment is for at least about 5 minutes at a temperature(s) of at least about 580 degrees C.

8. The coated article of claim 1, wherein the coated article is chemically durable in that it is characterized by a $\Delta C_G$ (glass side reflective) value of no greater than 3.0 when exposed to a boil comprising HCl for one hour.

9. The coated article of claim 1, wherein the coated article is chemically durable in that it is characterized by a $\Delta C_G$ (glass side reflective) value of no greater than 2.0 when exposed to a boil comprising HCl for one hour.

10. The coated article of claim 1, wherein the coated article has a visible transmission of from about 10–40%.

11. The coated article of claim 1, wherein the layer system consists essentially of the first and second layers and the layer comprising zirconium nitride.

12. A coated article including a layer system supported by a glass substrate, the layer system comprising:
    a first layer comprising silicon nitride;
    a metallic layer comprising zirconium provided on the glass substrate over the first layer comprising silicon nitride;
    a second layer comprising silicon nitride provided on the glass substrate over the metallic layer comprising zirconium;
    wherein the first layer comprising silicon nitride, located under the metallic layer comprising zirconium, is significantly thicker than the second layer comprising silicon nitride which is located over the metallic layer comprising zirconium, and
    wherein the second layer comprising silicon nitride is an overcoat so as to be an outermost layer of the layer system.

13. The coated article of claim 12, wherein the metallic layer comprising zirconium is in direct contact with each of the first and second layers comprising silicon nitride.

14. The coated article of claim 12, wherein the coated article is heat treated and has a $\Delta E^*_G$ (glass side reflective) value of no greater than 4.0 due to heat treatment.

15. The coated article of claim 12, wherein the coated article is heat treated and has a $\Delta E^*_G$ (glass side reflective) value of no greater than 2.5 due to heat treatment, wherein the heat treatment is for at least about 5 minutes at a temperature(s) of at least about 580 degrees C.

16. The coated article of claim 12, wherein the coated article is heat treated and has a $\Delta E^*_G$ (glass side reflective) value of no greater than 2.0 due to heat treatment.

17. The coated article of claim 12, wherein the coated article is chemically durable in that it is characterized by a $\Delta C_G$ (glass side reflective) value of no greater than 3.0 when exposed to a boil comprising HCl for one hour.

18. The coated article of claim 1, wherein the coated article comprises an IG window unit.

19. The coated article of claim 12, wherein the coated article comprises an IG window unit.

20. A window including a layer system supported by a glass substrate, the layer system comprising:
a first dielectric layer comprising silicon nitride;
a layer comprising zirconium;
a second dielectric layer comprising silicon nitride;
wherein the layer comprising zirconium is sandwiched between at least the first and second dielectric layers which comprise silicon nitride;
wherein the first dielectric layer comprising silicon nitride, located under the layer comprising zirconium, is significantly thicker than the second dielectric layer comprising silicon nitride which is located over the layer comprising zirconium;
wherein the layer system in combination with the glass substrate has a $\Delta E^*_G$ (glass side reflective) value of no greater than 4.0 when heat treated for thermal tempering; and
wherein the window has a visible transmission of from 10–40%.

21. The window of claim 20, wherein the layer comprising zirconium is one of metallic zirconium and zirconium nitride.

22. The coated article of claim 1, wherein the first layer comprising silicon nitride is at least twice as thick as the second layer comprising silicon nitride.

23. The coated article of claim 12, wherein the first layer comprising silicon nitride is at least twice as thick as the second layer comprising silicon nitride.

24. The window of claim 20, wherein the first layer comprising silicon nitride is at least twice as thick as the second layer comprising silicon nitride.

25. The coated article of claim 12, wherein the coated article has a visible transmission of from about 10–40%.

26. A coated article including a layer system supported by a glass substrate, the layer system comprising:
a first layer comprising silicon nitride;
a layer comprising zirconium nitride provided on the glass substrate over the first layer comprising silicon nitride;
a second layer comprising silicon nitride provided on the glass substrate over the layer comprising zirconium nitride;
wherein the first layer comprising silicon nitride, located under the layer comprising zirconium nitride, is significantly thicker than the second layer comprising silicon nitride which is located over the layer comprising zirconium nitride, and
wherein the coated article has a visible transmission of from about 10–40%.

27. The coated article of claim 26, wherein the coated article is blue in color due to design of layers of the layer system.

28. The coated article of claim 1, wherein the coated article is blue in color due to design of layers of the layer system.

29. The coated article of claim 16, wherein the coated article is blue in color due to design of layers of the layer system.

30. The window of claim 20, wherein the coated article is blue in color due to design of layers of the layer system.

* * * * *